United States Patent [19]
Tsai

[11] Patent Number: 5,088,705
[45] Date of Patent: Feb. 18, 1992

[54] BICYCLE SHOCK-ABSORBING APPARATUS

[75] Inventor: Chin S. Tsai, Hsin Chuang, Taiwan

[73] Assignee: Dan Ken Industrial Co., Ltd., Taipei, Taiwan

[21] Appl. No.: 680,885

[22] Filed: Apr. 5, 1991

[51] Int. Cl.⁵ .......................... F16F 3/07; F16F 13/00
[52] U.S. Cl. ...................................... 267/226; 267/34; 267/151; 267/170; 280/276; 280/284
[58] Field of Search ................... 267/34, 35, 151, 152, 267/170, 226; 280/276, 284

[56]  References Cited
U.S. PATENT DOCUMENTS

| | | | |
|---|---|---|---|
| 3,687,438 | 8/1972 | Rickard | 267/226 |
| 4,318,535 | 3/1982 | Imai | 267/226 |
| 4,971,344 | 11/1990 | Turner | 280/276 |

FOREIGN PATENT DOCUMENTS 857756  1/1961  United Kingdom ................ 267/151

Primary Examiner—George E. A. Halvosa
Attorney, Agent, or Firm—Varndell Legal Group

[57] ABSTRACT

A bicycle shock-absorbing apparatus comprises an inner tube and an outer tube. The inner tube is inserted into the outer tube. An upper spring socket and a lower spring socket are disposed in the inner tube and the outer tube separately. A compression spring is disposed between the spring sockets, oil being filled between the spring sockets. The inner tube is fixedly attached to the upper spring socket and corelatedly actuated with the spring to achieve a shock absorbing effect. A hole is formed in the center of the upper spring socket, enabling oil to flow therethrough. An oil seal is disposed inside the top of the outer tube to prevent oil spillage. An air inlet socket is attached inside an upper wall of the inner tube, while an air inlet valve is received by the air inlet socket to enable inflation of the inner tube. The air, in cooperation with the spring and the oil, provide elasticity for the bicycle shock-absorbing apparatus.

1 Claim, 3 Drawing Sheets

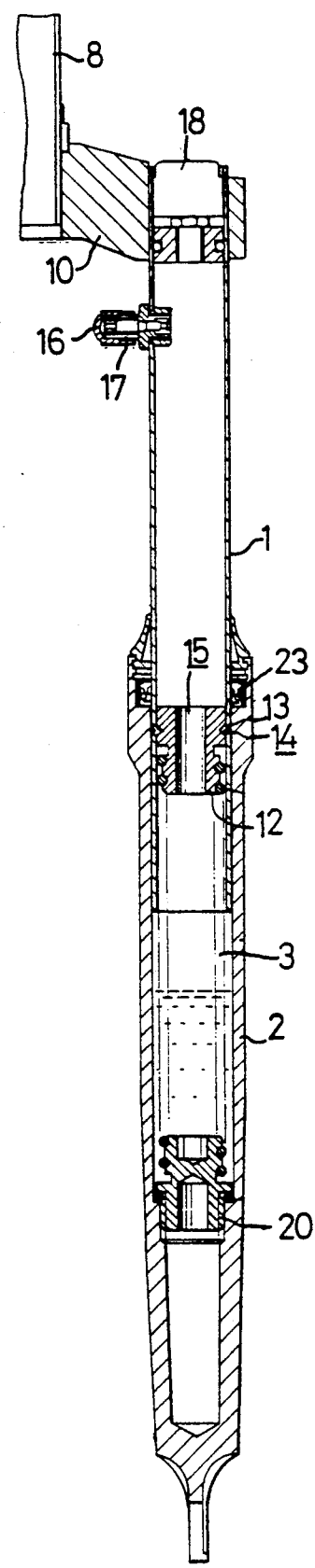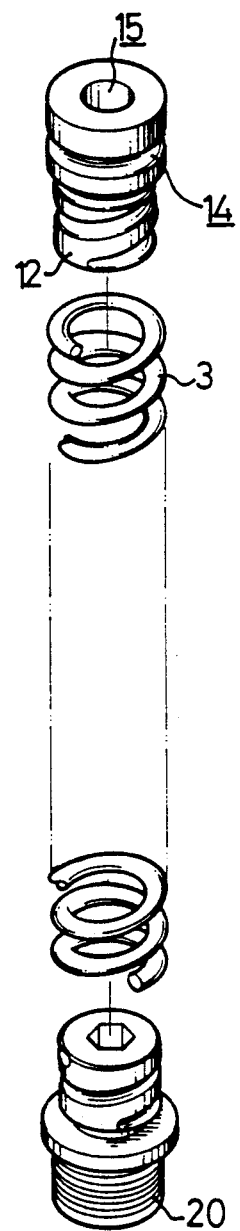
Fig. 2
Fig. 3

BICYCLE SHOCK-ABSORBING APPARATUS

BACKGROUND OF THE INVENTION

This invention relates to a bicycle shock-absorbing apparatus, and more particularly, to a bicycle shock-absorbing apparatus with an inner tube inserted into an outer tube with a spring, compression air, and damping oil therebetween in order to provide appropriate buffering elasticity to effect the function of shock absorbing.

Conventional bicycles generally do not have any shock-absorbing apparatus attached to either the front or rear wheel axles. Therefore, the biker will feel uncomfortable when passing over a rugged road. In addition, extended use on the rugged road will damage the bicycle. With the above drawback, the bicycle needs to be improved to reach a better performance. U.S. Pat. No. 4,971,344 teaches a bicycle with a front fork wheel suspension that utilizes a pair of tubes and a spring-loaded valve, so that the latter can regulate the flow of fluid between the pair of tubes and thus absorb shock from a load.

SUMMARY OF THE INVENTION

It is an object of the present invention to provide a bicycle shock-absorbing apparatus which applies the adjustment between oil pressure, air pressure, and spring elasticity inside a pair of tubes to absorb shock from a rugged road while not affecting the pedal drive energy, so as to reach a best effect of shock absorbing by means of a light construction.

It is another object of the present invention to provide a bicycle shock-absorbing apparatus with an air inlet valve and an air inlet socket at the top of the inner tube to enable inflation thereof, and to cooperate with the spring and damping oil to provide a good shock-absorbing effect, so as to increase the life of the bicycle and provide the biker a more comfortable ride.

These and additional objects, if not set forth specifically herein, will be readily apparent to those skilled in the art from the detailed description provided hereunder, with appropriate reference to the accompanying drawings.

BRIEF DESCRIPTION OF THE DRAWINGS

FIG. 2 is a sectional view of the shock-absorbing apparatus in accordance with the present invention;

FIG. 3 is an exploded view showing the relation of a spring and spring sockets in accordance with the present invention;

DETAILED DESCRIPTION OF THE PREFERRED EMBODIMENTS

Figure 1:
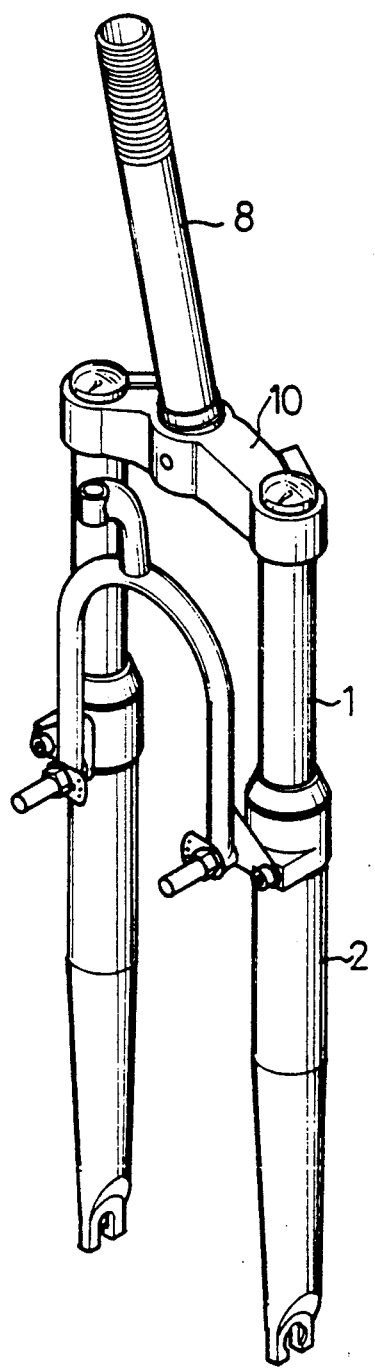
FIG. 1 is a perspective view of an embodiment in accordance with the present invention.

Referring to FIGS. 1 and 2, a bicycle shock-absorbing apparatus comprises an inner tube 1, and an outer tube 2. An upper terminal of the inner tube 1 is fixedly attached to a bicycle upper crown 10, which in turn is fixedly attached to a steering tube 8 of a bicycle at a middle portion thereof, while a lower terminal of the outer tube 2 is attached to a front wheel axle (not shown). A lower terminal of the inner tube 1 is inserted into an upper terminal of the outer tube 2. An upper spring socket 12 is disposed inside a lower portion of the inner tube 1, while a lower spring socket 20 is disposed at a lower portion of the outer tube 2. A compression spring 3 is disposed between the upper spring socket 12 and the lower spring socket 20, with an upper end of the compression spring 3 mounted to the upper spring socket 12, while a lower end of the spring 3 is mounted to the lower spring socket 20. Damping oil partially fills the outer tube 2. An annular protrusion 13 protrudes inward from an inner surface of the lower portion of the inner tube 1. The protrusion 13 may be V-shaped or of any other suitable shape.

Referring to FIG. 3, an annular groove 14 is formed in the upper spring socket 12 for accommodating the protrusion 13, thereby, fixedly attaching the inner tube 1 to the upper spring socket 12 and corelatedly actuating with the spring 3. A hole 15 formed in the middle of the upper spring socket 12 enables oil to flow therethrough. An oil seal 23 is disposed at the top of the outer tube 2 to prevent the spillage of oil. An air inlet socket 16 and an air inlet valve 17 are located at an upper wall of the inner tube 1 to inflate air therein, thereby, in conjunction with the damping oil and spring, providing appropriate buffering elasticity for the bicycle shock absorbing apparatus. A pressure meter 18 is disposed at a top portion of the inner tube 1 for indicating the user to press proper pressure of air into the inner tube 1.

Figure 4:
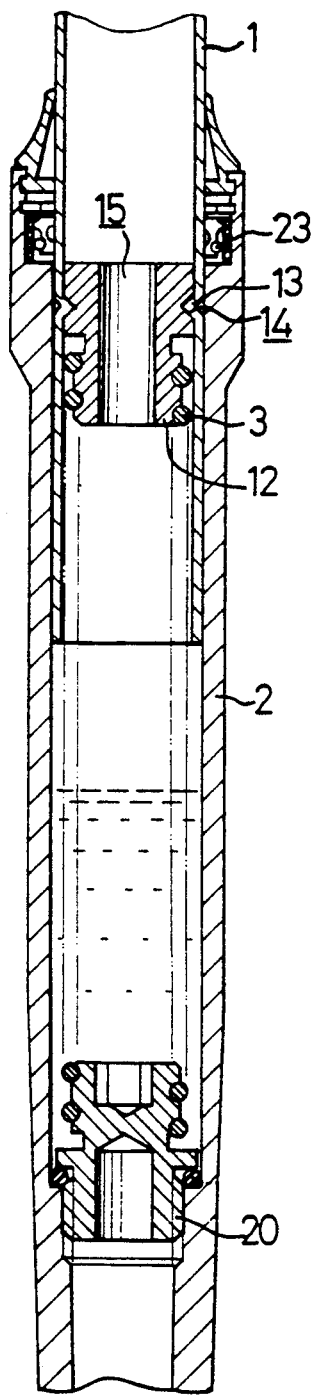
FIG. 4 is sectional view of an extended shock-absorbing apparatus.

Referring to FIG. 4, when the shock-absorbing apparatus in the present invention is in a normal mode (not compressed), the inner tube 1 is not strained, the spring is in an extended status, and the damping oil is under the upper spring socket 12.

Figure 5:
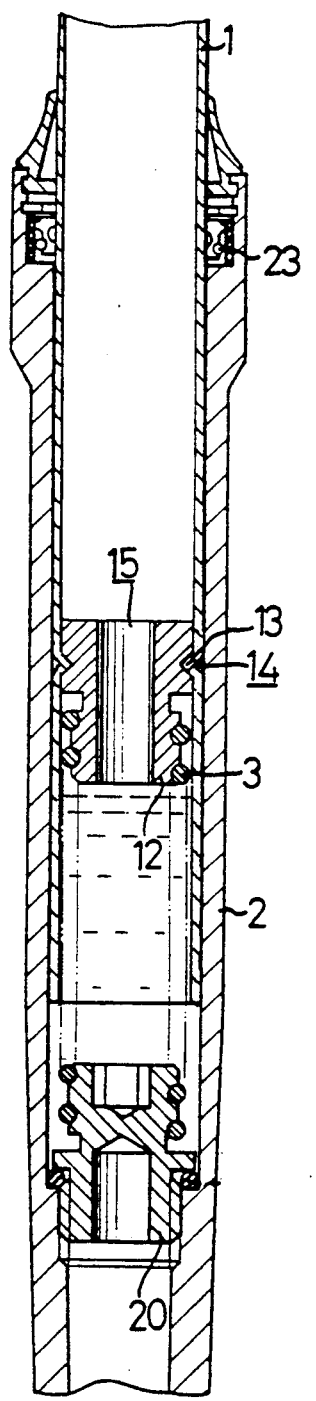
FIG. 5 is a sectional view of a compressed shock-absorbing apparatus.

Referring to FIG. 5, if the bicycle is moving on a road, and its front wheel contacts a rough or rugged bump, then the spring 3 will compress, causing the inner tube 1 to insert into the outer tube 2, and the damping oil to be compressed by the pressure from upper spring socket 12, thereby flowing through the hole 15 into the inner tube 1. When the spring 3 is released and back to a normal mode, then the inner tube 1 and the outer tube 2 will return to a normal mode, as shown in FIG. 4.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A bicycle shock absorbing apparatus including an inner tube and an outer tube, said inner tube being inserted into said outer tube and said outer tube being filled with oil, the improvement comprising:
   an annular protrusion protruding inward from an inner surface of a lower portion of said inner tube;
   an upper spring socket being disposed inside a lower portion of said inner tube, having an annular groove therein for accommodating said protrusion of said inner tube, thereby fixing said inner tube to said upper spring socket;
   a lower spring socket being disposed inside a lower portion of said outer tube;
   a compression spring being disposed between said upper spring socket and said lower spring socket, an upper end of said compression spring being mounted on said upper spring socket, and a lower end of said compression spring being mounted on said lower spring socket, thereby engaging and corelatedly actuating said spring with said inner tube;

a hole being formed in the middle of said upper spring socket for enabling oil to flow therethrough;

an oil seal being disposed at a top of said outer tube for preventing the spillage of oil;

an air inlet socket and an air inlet valve being located at an upper wall of said inner tube for inflating air therein; and a pressure meter being disposed at a top portion of said inner tube for showing air pressure inside said inner tube.

* * * * *